Dec. 20, 1938. R. R. SMITH Re. 20,952
ICE SHAVING MACHINE
Original Filed Feb. 3, 1931 2 Sheets-Sheet 1
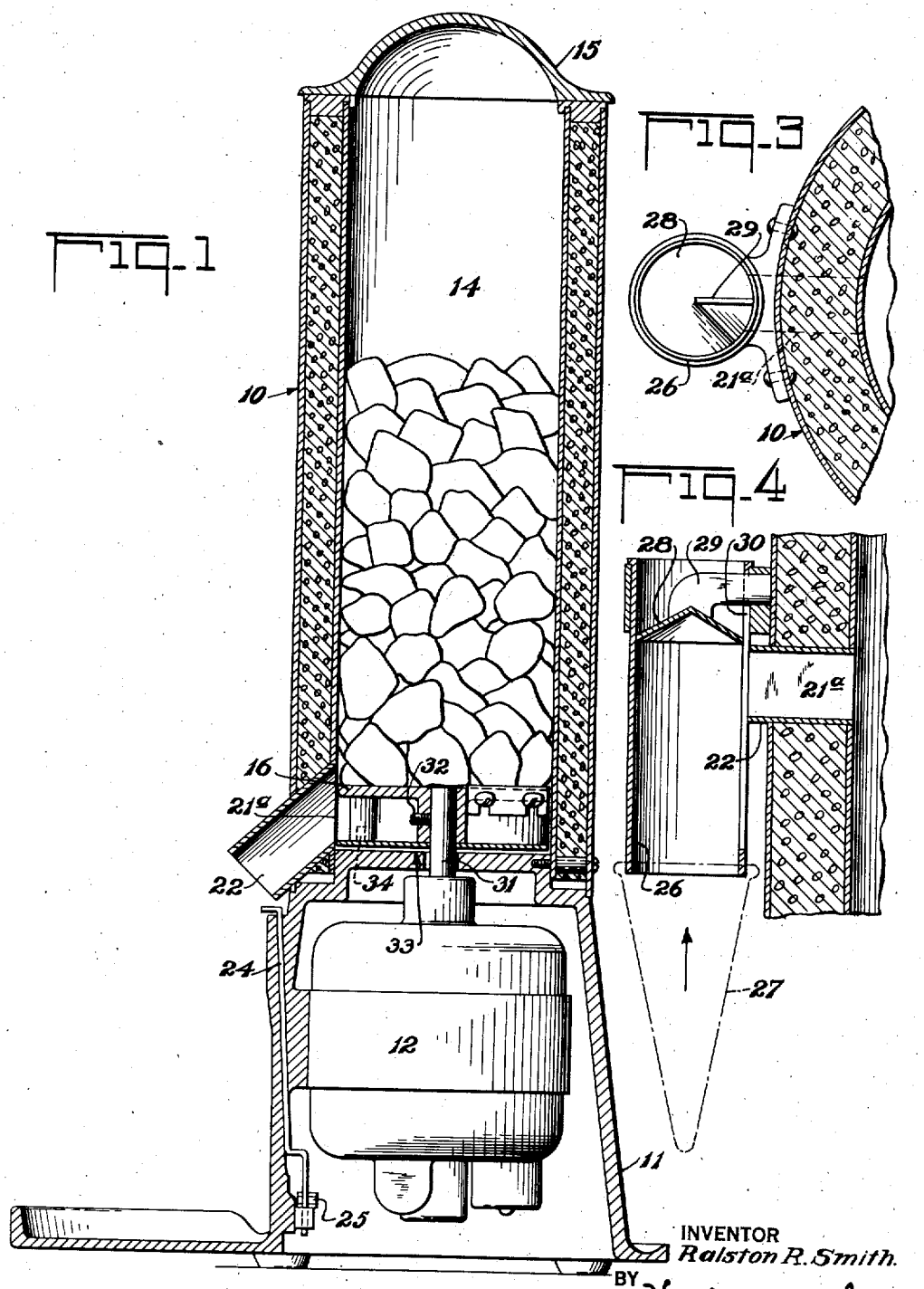
INVENTOR
Ralston R. Smith.
BY
Van Dewenter & Grier
ATTORNEYS Dec. 20, 1938. R. R. SMITH Re. 20,952

ICE SHAVING MACHINE

Original Filed Feb. 3, 1931 2 Sheets-Sheet 2

INVENTOR
Ralston R. Smith.
BY
Van Deventer & Grier
ATTORNEYS

Reissued Dec. 20, 1938

Re. 20,952

UNITED STATES PATENT OFFICE 20,952

ICE SHAVING MACHINE

Ralston R. Smith, Oakland, Calif., assignor, by mesne assignments, to Service Devices, Inc., a corporation of New York Original No. 1,992,783, dated February 26, 1935, Serial No. 513,127, February 3, 1931. Application for reissue February 24, 1937, Serial No. 127,398

7 Claims. (Cl. 83—62)

This invention relates to machines for use in shaving ice in the production of a confection commonly known as "snow cones", which confection is produced by filling a cone with shaved ice and applying a flavored syrup thereto. The present machine is, however applicable to other uses as hereinafter set forth.

It is the principal object of the present invention to provide an improved machine of the character referred to which is electrically operated and which is of simple and inexpensive construction.

In practicing the invention, I provide a rotor carrying shaving blades, which rotor is revolved by an electric motor and is capable of shaving the material as it is fed toward the rotor and of discharging the material from the machine.

One form which the invention may assume is exemplified in the following description and illustrated by way of example in the accompanying drawings, in which:

Figure 1 is a central vertical section through a machine embodying the preferred form of my invention;

Figures 3 and 4 are enlarged fragmentary views in plan and vertical section reciprocably showing a cone-filling fitting which may be used in connection with the discharge spout of the machine;

Referring more particularly to the accompanying drawings, 10 indicates an ice shaving machine comprising a hollow base 11 by means of which the machine is to be supported. This base 11 incloses an electric motor 12 which motor is arranged with its shaft vertically disposed. The motor is, as disclosed, arranged centrally within the base with its shaft projecting centrally upwardly through the upper end of the base.

Figure 7:
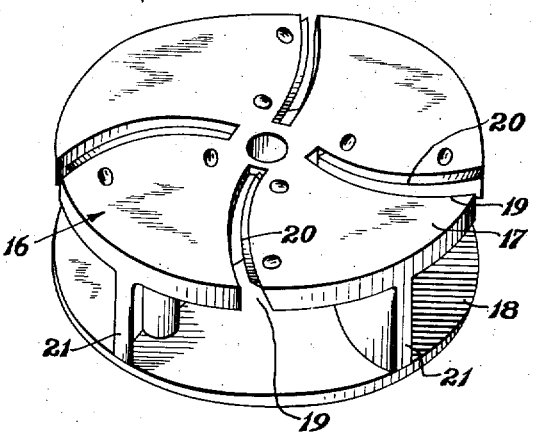
Figure 7 is a perspective view of the rotor of the machine shown in Figure 1.
Figure 8:
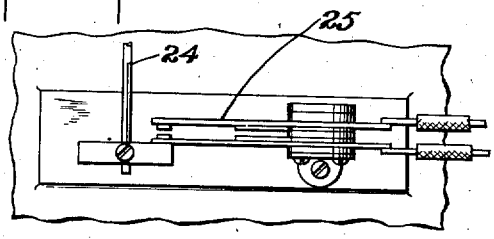
Figure 8 is a fragmentary view disclosing the control switch for the motor circuit.

Obviously any other arrangement of motor and gearing could be employed, the only requisite being that a driving shaft 31 be centrally located within the chamber 14 to drive the rotor, Figure 7, located therein.

Secured to the base at its lower end and extending vertically with respect thereto, is a receiving chamber 14. When the machine is used for shaving ice this chamber is preferably formed with insulating walls as illustrated. The chamber 14 is cylindrical in cross section and is arranged concentrically with respect to the shaft of the motor 12. The upper end of the chamber is fitted with a removable closure member 15. When this member is removed the material to be shaved may be fed into the chamber 14.

Secured on the driving shaft 31 is a rotor 16 which is formed of two discs 17 and 18 which are concentrically disposed and fixed together at a spaced distance apart. The diameter of these discs 17 and 18 is just slightly less than the interior diameter of the chamber 14. The upper disc 17 is formed with a plurality of radial slots 19 which are slightly curved as illustrated. A shaving blade 20 is arranged in each slot and adjustably secured to one edge thereof. The sharpened edges of these blades project slightly above the upper surface of the upper disc 17 so as to engage and shave the material disposed in the chamber 14.

Between the discs 17 and 18 are radially disposed and curved vanes 21. These vanes eminate from the center of the discs to the outer periphery thereof and are so relatively disposed with relation to the slots 19 that the latter will be positioned intermediate the vanes. When the rotor revolves and shaves the material, the shaved material will pass through the slots 19 and the vanes 21 will act to discharge it through a discharge opening 21*a* and through a spout 22 aligned with such opening.

As shown in Figures 1 and 7, the rotor has a hub portion from which the vanes 21 radiate. These vanes are shown as integral with the upper disc 17, the lower disc being secured to the structure formed by vanes 21 and disc 17 by means of screws 34. Obviously this construction can be reversed and the vanes made integral with the lower disc 18, or if desired, the rotor can be made in one piece. The exact construction of the rotor is immaterial in carrying out the invention, which comprises in its broad aspects a unit rotor having a hub for attachment to a driving shaft, an upper cutting plate, a lower imperforate plate to receive the cut material and radial vanes to discharge the material from the spaces within the rotor.

Figure 5:
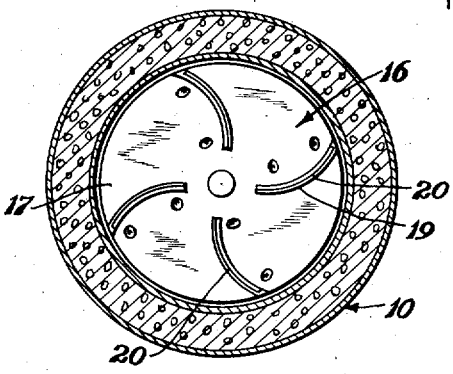
Figure 5 is a transverse sectional view through the machine taken just above the rotor.
Figure 6:
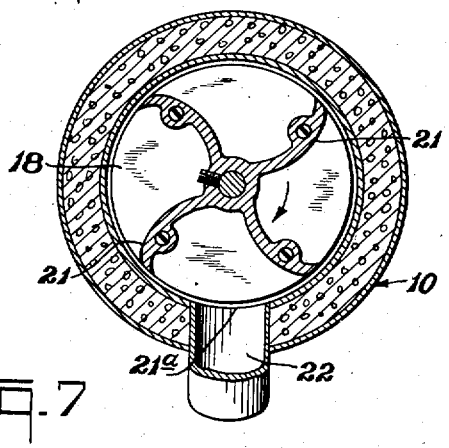
Figure 6 is a transverse sectional view through the machine taken intermediate the discs of the rotor.
Figure 2:
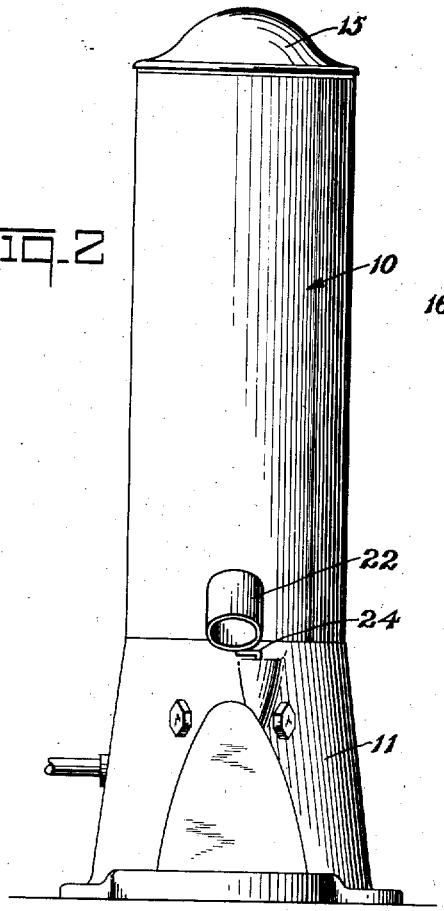
Figure 2 is a front elevation thereof.

In Figures 1 and 2 the spout 22 projects from the chamber for the purpose of directing the shaved material directly into a container. In this form of the device a switch rod 24 is mounted in the base for vertical reciprocation and its lower end is operatively connected with a control switch 25 interposed in the motor circuit. This switch is of the type which normally tends to remain open. To close the switch and incidentally close the motor circuit, the container to receive the shaved material is engaged with the upper end of the switch rod 24 so as to move the switch rod vertically. This moving of the switch rod 24 closes the switch 25 and places the motor in operation. When the container is disengaged from the switch rod 24, the switch automatically opens and opens the motor circuit.

This arrangement is quite important and valuable in machines of this character as the operation of bringing the glass to receive the shaved ice into a clamp and into engagement with a switch lever as shown in the patent to Howard et al. 1,249,403, granted December 11th, 1917, or of setting the glass on a switch mechanism as shown in the patent to Reed 1,333,094, granted March 9th, 1920, can be eliminated. It takes the average operator not over 2 or 3 seconds to place the glass, held in the hand in the usual manner, in position and shave sufficient ice for the average drink with the switch arrangement herein disclosed.

The glass never leaves the hand and often the operator holds 2 or more glasses in the same hand, bringing each quickly into engagement with the upper end of switch rod 24 to operate the machine as previously described.

In Figures 3 and 4 I have shown an appliance used in connection with the spout 22 for tightly packing shaved ice in a cone. This device comprises a vertical reciprocable cylinder 26 mounted on the outer periphery of the chamber 14. The diameter of this cylinder 26 is such that it will nest within the extreme upper end of a cone 27 within which it is desired to pack the shaved ice. At the inner side of the cylinder 26 it is formed with an opening registering wth the open end of the spout 22 so that the shaved ice passing through the spout will discharge into the cylinder 26 to fill the cone.

Mounted within the upper end of the cylinder is a stationary conical plunger 28 fixed to the chamber 14 by means of an arm 29 which passes through a slot 30 at the inner side of the cylinder 26. When sufficient shaved ice has been accumulated within the cylinder 26 and the cone 27, the latter is moved upwardly so as to move the cylinder 26 upwardly. This movement causes the stationary plunger 28 to tightly pack the ice in the cone 27.

In operation of the device, if it is desired to shave ice, the same is disposed in the chamber 14 and the motor is placed in operation. As the motor revolves the rotor 16 the blades thereof will act to shave the ice and the vanes 21 thereof will discharge the shavings through the spout 22. If the device is to be used in connection with small cones the spout 22 is fitted with a packing attachment such as illustrated in Figures 3 and 4. If the machine is for use merely in depositing shaved ice in glasses for use in connection with liquid refreshments, a switch arrangement such as illustrated in Figure 1 is employed for controlling the operation of the motor. In this connection it is desired to point out that in placing shaved ice in glasses it is only necessary to move the switch rod 24 upwardly by means of the glass and the motor will start operating, and when sufficient ice has been deposited in the glass, the glass is merely disengaged from the switch rod 24 and the motor will immediately discontinue.

I desire to point out, however, that the present machine may be utilized in grinding or shaving vegetables and other material. This makes the machine applicable for use as a culinary device.

From the foregoing it is obvious that I have provided an improved shaving and grinding machine which is simple in construction and efficient in operation.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a machine for shaving ice, a vertically disposed container supported on a hollow base and having a discharge opening adjacent its bottom, a motor enclosed in said base and having a drive-shaft extending upwardly to a position within the container, a rotor disposed in the bottom of the container and secured to said drive-shaft, said rotor comprising a pair of horizontally-disposed, vertically-spaced discs, the uppermost of said discs being provided with radial slots, blades secured in said slots to shave ice in the container, and radial vanes extending between said discs to insure the discharge of all of the shaved ice outwardly through said discharge opening.

2. In a machine of the character described, a hollow base forming a support for said machine, a motor enclosed in said base and having a substantially vertical driving shaft extending therefrom, an insulated container forming a chamber secured to said base and positioned thereon with said chamber substantially concentric with said shaft, a spout in communication with said chamber and having its discharge end positioned above the bottom of said base to permit the discharge of material therefrom into a vessel outside said base, a switch in circuit with said motor mounted within said base and having a portion extending outwardly therefrom whereby said switch may be manually operated, and a unitary rotor having a hub for attachment to said shaft comprising an upper cutting plate, a lower imperforate plate to receive cut material and radial vanes extending from said hub and between said plates to discharge cut material from therebetween.

3. In apparatus of the character described, a member having insulated walls forming a vertical chamber for receiving material to be shaved, a hollow base supporting said chamber, a rotor positioned at the lower end of said chamber and toward which the material to be shaved is fed by gravity, said rotor including discs, one of said discs having radial slots formed therein, blades carried on said slotted disc and having their edges adjacent each slot, said chamber having a horizontal discharge opening formed therein contiguous to the periphery of the rotor, a hub having vanes extending therefrom and formed integral with one of said discs and spanning the space between said discs and disposed intermediate the aforesaid slots to discharge by centrifugal force the shaved material passing through the slots through the discharge opening, and a motor within said base operatively connected to said rotor.

4. In ice chipping apparatus of the character described, a vertically disposed chamber, a rotor concentrically mounted within said vertically disposed chamber near the lower end thereof with its axis vertical and parallel to the axis of said chamber and adapted to rotate on its vertical axis, said rotor including discs vertically spaced apart from each other, one of said discs having a plurality of radial slots formed therein, a blade having a cutting edge projecting above the upper surface of said slotted disc, said chamber having a horizontal discharge opening formed therein at the perimeter of the rotor, a hub and radial vanes extending therefrom formed integral with one of said discs extending across the space between said discs and positioned intermediate said slots so as to discharge by centrifugal force the material passing through said slots through said discharge opening, and a motor beneath said chamber operatively connected with said rotor to operate the same.

5. In a machine of the character described, a vertically disposed container supported on a hollow base and having a horizontal discharge opening adjacent its bottom, a motor enclosed in said base, a rotor rotatable on a vertical axis and disposed concentrically within said container at the bottom thereof and in line with said discharge opening, said rotor comprising a horizontally disposed lower imperforate disc and an upper disc substantially parallel to and spaced apart from said lower disc and provided with radial slots having cutting blades positioned above said slots to shave material in the container, a hub and radial vanes extending therefrom formed integral with one of said discs of a height equal to the space between the discs to space the same and insure the discharge of all of the shaved material outwardly through said discharge opening by throwing said material therein with centrifugal force, and driving means also within said base connecting said motor and said rotor.

6. In an ice shaving machine, a vertical chamber for the reception of ice, a rotor rotatable on a vertical axis and positioned adjacent the bottom of and within said chamber and in concentric relation to the inner wall of said chamber, said rotor comprising a pair of horizontally disposed vertically spaced discs, the lower of said discs being imperforate and the upper most disc having radial slots and blades extending slightly above the surface thereof and adapted to simultaneously shave said ice upon rotation of the rotor, a hub and radial vanes extending therefrom formed integral with one of said discs and interposed between said discs to engage and rotate the shaved ice, said chamber having a discharge opening in alignment with the space between said discs whereby the shaved ice will be discharged by centrifugal force therethrough, and a motor in bottom of said chamber and having a shaft supporting said rotor.

7. In a machine of the character described, a vertical chamber for the reception of ice, a rotor forming a bottom for said chamber, said rotor comprising horizontally disposed spaced discs each of substantially the same diameter as the chamber, the lower disc being imperforate and the uppermost of said discs having slots and cutting blades whereby ice in the chamber will be shaved and received between said discs, a hub and radial vanes integral with one of said discs and located therebetween, certain of the vanes extending from said hub to the periphery of the discs whereby all of the ice shaved will be rotated and cast outwardly by the rotor, a vertical shaft supporting said rotor, and a motor for rotating said shaft.

RALSTON R. SMITH.